A. R. MUIRHEAD.
MEASURING, WEIGHING, AND REGISTERING MACHINE.
APPLICATION FILED MAR. 31, 1919.

1,319,105.

Patented Oct. 21, 1919.
6 SHEETS—SHEET 1.

Inventor
A. R. Muirhead,
By
W. B. Jaynes,
Attorney

A. R. MUIRHEAD.
MEASURING, WEIGHING, AND REGISTERING MACHINE.
APPLICATION FILED MAR. 31, 1919.

1,319,105.

Patented Oct. 21, 1919.
6 SHEETS—SHEET 3.

A. R. MUIRHEAD.
MEASURING, WEIGHING, AND REGISTERING MACHINE.
APPLICATION FILED MAR. 31, 1919.

1,319,105.

Patented Oct. 21, 1919.
6 SHEETS—SHEET 5.

A. R. MUIRHEAD.
MEASURING, WEIGHING, AND REGISTERING MACHINE.
APPLICATION FILED MAR. 31, 1919.

1,319,105.

Patented Oct. 21, 1919.
6 SHEETS—SHEET 6.

UNITED STATES PATENT OFFICE.

ALFRED ROBERT MUIRHEAD, OF HILLSBORO, TEXAS.

MEASURING, WEIGHING, AND REGISTERING MACHINE.

1,319,105.  Specification of Letters Patent.  Patented Oct. 21, 1919.

Application filed March 31, 1919. Serial No. 286,230.

*To all whom it may concern:*

Be it known that I, ALFRED ROBERT MUIRHEAD, a citizen of the United States of America, residing at Hillsboro, in the county of Hill and State of Texas, have invented certain new and useful Improvements in Measuring, Weighing, and Registering Machines, of which the following is a specification.

This invention relates to a device for the automatic weighing of grain, seed or similar material, and the registering and recording of the said weights, the latter part of the said operation not forming however a part of the present application. While not limited to the handling of any special material the invention is especially adapted for the weighing of cotton seed in transit from a gin or seed house or for the weighing of grain from elevator to mill.

The invention especially relates to novel means for automatically guiding a pawl into engagement with the proper tooth of a ratchet wheel, thereby causing said wheel to rotate a sufficient extent to properly and accurately register or record the weight of the material handled.

The invention further consists in the novel features of construction hereinafter described, pointed out in the claims, and shown in the drawings, in which:—

Fig. 2 is a front elevation, partly in section and a feed chute being removed.

The mechanism shown in the drawings is the preferred form, and it will be understood that said mechanism, with certain exceptions, is inclosed in a suitable dustproof casing, which casing is omitted in order that the parts may be more clearly shown.

In constructing and operating the device I employ a suitable feed or delivery chute 1 delivering the material to be weighed from any suitable source. Adjacent the delivery end of the chute is located the mechanism to be hereinafter described and which is supported by a suitable frame 2. In alinement with the delivery end of the chute is an upper hopper 3 having a movable sectional bottom 4. Below this is a lower hopper 5, having movable bottom sections 6.

These hoppers are supported by arms 7 and 8 respectively, which arms form a part of the weighing mechanism, and it will be understood that they extend through the casing, any suitable means, not shown, being provided for covering the openings to exclude dust, and at the same time allow free vertical movement of the arms.

At their outer ends the arms carry castings 9 and 10 having forks 11 and 12. These are mounted respectively on knife edge bearings 13, 14 on projecting portions of the frame, and the hoppers are supported in said forks on knife edge bearings 15 and 16, as in Figs. 1 and 2.

Said mechanism comprises a main shaft 17 on which I mount a cam 18 having on its cam face a recess 19. Also on said shaft are mounted oval shaped oppositely arranged cams 20 and 21, a worm gear 22, a disk 23 notched as at 24 and a cam 25.

The shaft 17 is designed to have an interrupted rotation, making one complete rotation and then stopping. The driving power of this shaft is a worm shaft 26 which is mounted in a sleeve 27 said sleeve being loosely journaled on a shaft 28 at right angles to the shaft 17.

A drive shaft 29, mounted to allow slight vertical play has its inner end mounted in the sleeve 27 and at its outer end the shaft 29 carries a drive pulley 30.

This mounting of the worm shaft and manner of connecting it to the power shaft allows for disengagement of the worm shaft 26 from the worm gear 22 at certain predetermined intervals as will be hereafter explained.

Upper and lower shafts 30, 31 support the means for actuating the hopper bottoms 4 and 6. On the upper shaft 30 is mounted an angled arm 32 said arm bending downwardly and thence inwardly. To the outer portion of the arm are connected links 34 and 35, crossing each other and pivoted respectively to the bottom sections. The link 35 is angled and a connecting short link 36 connects the link 35 with the link 34. The inner end of the arm 32 stops adjacent the main shaft 17 and carries a roller 37 in the path of travel of the cam 20.

A substantially similar construction is employed for actuating the sections of the bottom 6 of the lower hopper.

On shaft 31 is mounted an angled arm 33 connected to the bottom sections by links 38, 39, with cross link 40, and this arm carries at its inner end a roller 41 lying in the path of the cam 21.

Figure 3:
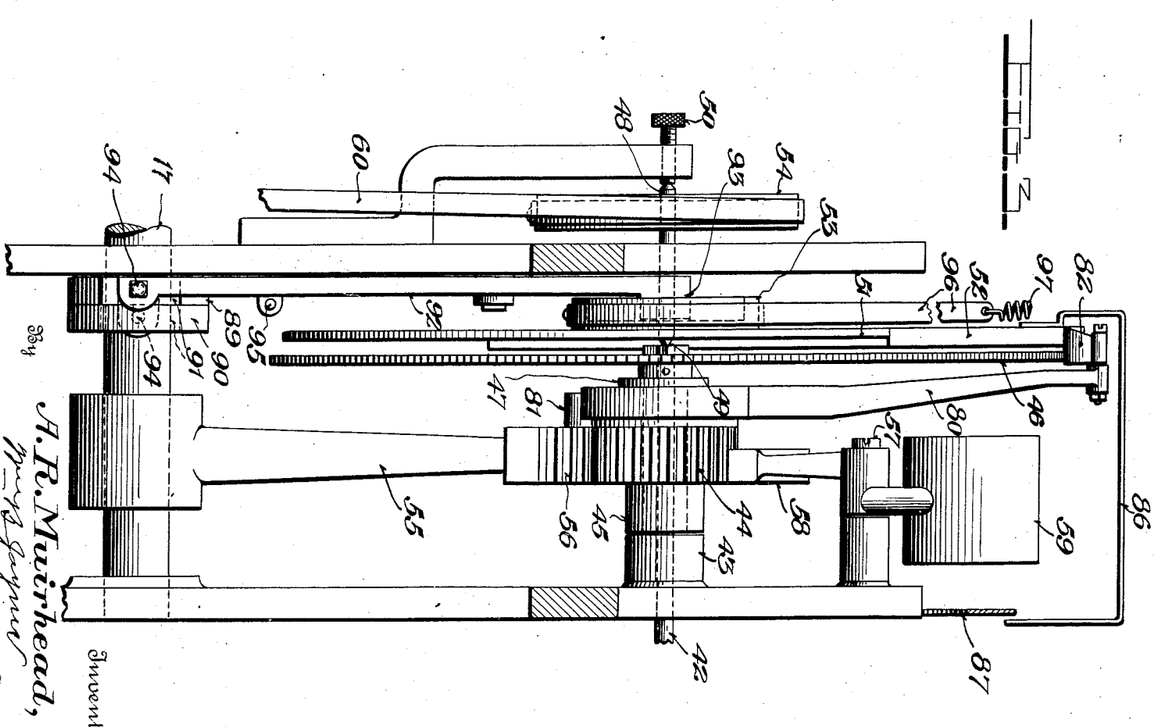
Fig. 3 is an enlarged detail view showing parts of the indicating and registering devices, and means for actuating them.
Figure 4:
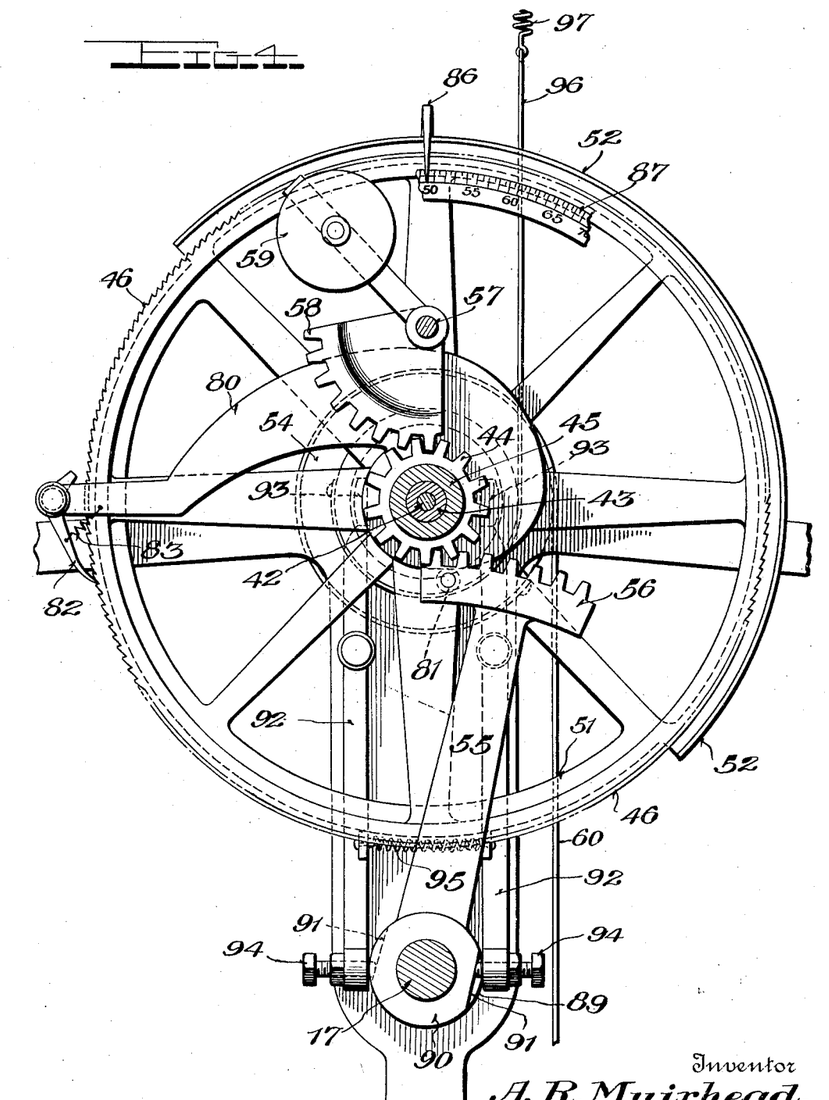
Fig. 4 is a similar view at right angles to Fig. 3, parts being in section.

Referring now more especially to Fig. 3 it will be noted that above and parallel to shaft 17 is a short stub shaft 42 and on said shaft is a hollow stud 43. Turning loosely on the stud 43 is a pinion 44 with extended hub portion 45. A ratchet wheel 46 is fixed on the inner end of shaft 42 and the inner end of the stud 43 carries a collar 47 to prevent any frictional contact between the ratchet wheel and any parts carried by the hollow stud, as will appear more fully hereafter.

A short shaft 48 is mounted at one end in a suitable bearing formed on the inner end of shaft 42 and the other end is held in the cup end of a bearing screw 50. I prefer to employ hardened trunnion bearings 49 at the point of juncture between shafts 42 and 48.

Mounted on the shaft 48 is a wheel 51 having a sector portion 52. This sector portion has a diameter greater than the remaining portion of the wheel, which acts merely as a counterbalance, and the sector portion is flanged or thickened so as to present a comparatively broad periphery.

A brake wheel 53 and a tape wheel 54 are also fixed on the shaft 48.

On the main shaft 17 is fixed an arm 55 having a rack sector 56 adapted to mesh once with the pinion 44 during each rotation of shaft 17. On a stub shaft 57, above shaft 42 is mounted a sector 58, meshing with the pinion 44 and having a counterbalance 59.

A tape 60 is secured to the tape wheel 54 and at its lower end is connected to a movable cuff 61 on the arm 8, supporting the lower hopper.

To said arm 8 is also connected a spring 62, with tension nut 63.

Figure 1:
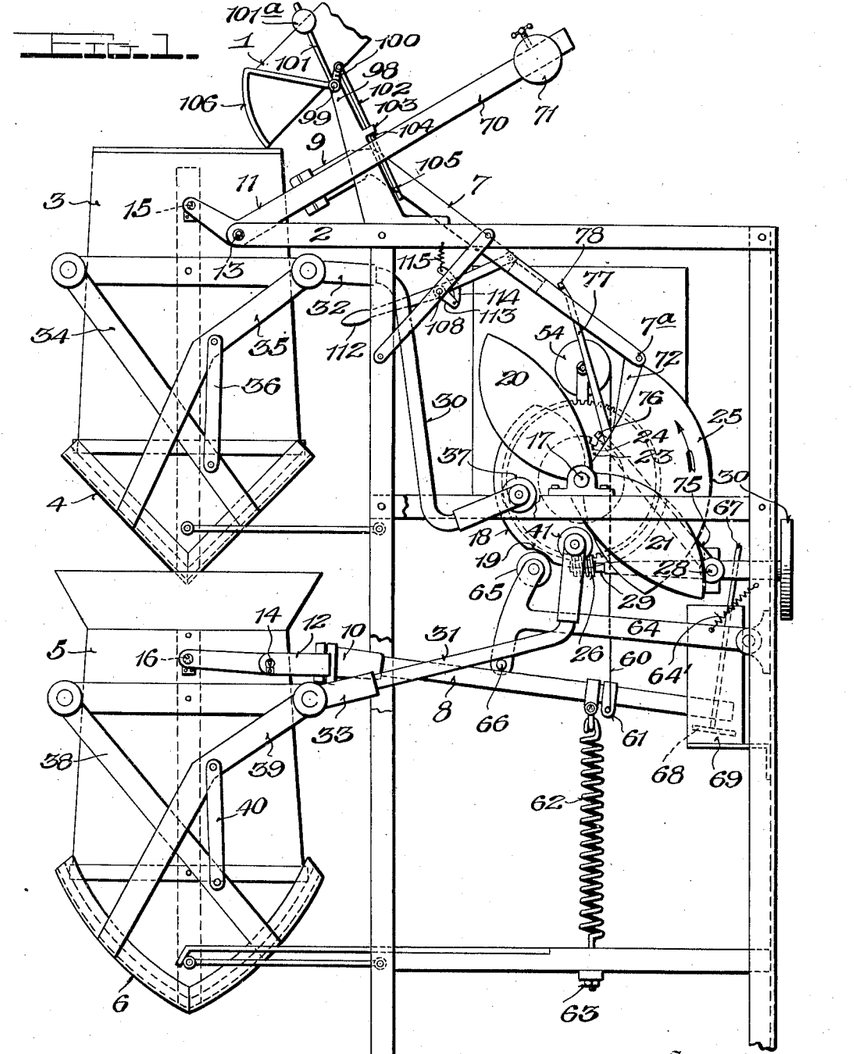
Figure 1 is a side elveation, a casing being removed, and parts of a frame being broken out, showing the weighing mechanism, recording devices being removed.

From Fig. 1 it will be noted that below the shaft 17 is a pivoted T-arm 64 having a roller 65 adapted to be engaged by the cam 18 and a pin 66 adapted to engage the arm 8, the T-arm being arranged between the cam 18 and the arm 8, and in the drawing the roller 65 is shown as seated in the recess 19 of the cam. A suitable spring 64' serves to support the T-arm in its elevated position, and the recess 19 permits sufficient upward movement of the T-arm to cause the pin 66 to clear the top of arm 8, thereby allowing limited upward play of the said arm.

To the inner end of the arm 8 is connected a U-shaped arm 67 one member of which carries a dash 68 which works in a dash pot 69.

It will be noted therefore that the lower hopper is normally held in elevated position by the downward pull of the spring 62, or its weight equivalent, said pull being adjusted by the nut 63.

The upper arm 7 supporting the hopper 3 has an arm 70, at an angle to the inner portion of the arm 7, which carries a slidable counterweight 71, and which serves to normally hold the hopper 3 in its upper position.

Figure 7:
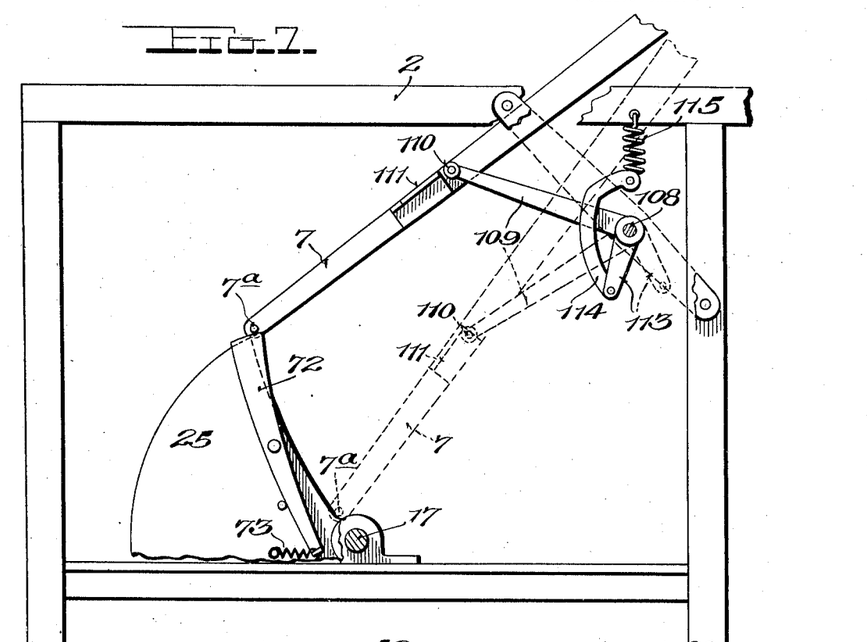
Fig. 7 is a detail view illustrating means for manually operating the device for the weighing of fractional lots.
Figure 8:
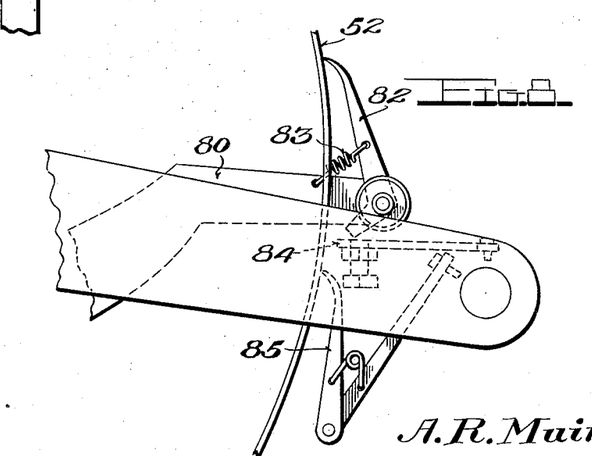
Fig. 8 is a detail view illustrating the construction of a pawl and detent.

The cam 25 carries on one edge, or at one end, a latch member 72, held normally in advance of the cam edge by a spring 73, said latch and cam being engaged by a pin 7ª carried by the inner end of the arm 7, supporting upper hopper. This latch construction is most clearly shown in Fig. 7. From Fig. 5 it will be seen that an arm 75 extends upwardly from the bearing point of sleeve 27, viz. the shaft 28 and said arm has a lateral extension or lug 76 which engages the disk 23, and holds the worm gear 22 into mesh with the worm 26, except when said lug drops into the notch 24, when the worm shaft, by reason of its flexible mounting, is allowed to drop a sufficient distance to disengage the worm from the worm gear, thereby cutting off power to shaft 17.

Figure 5:
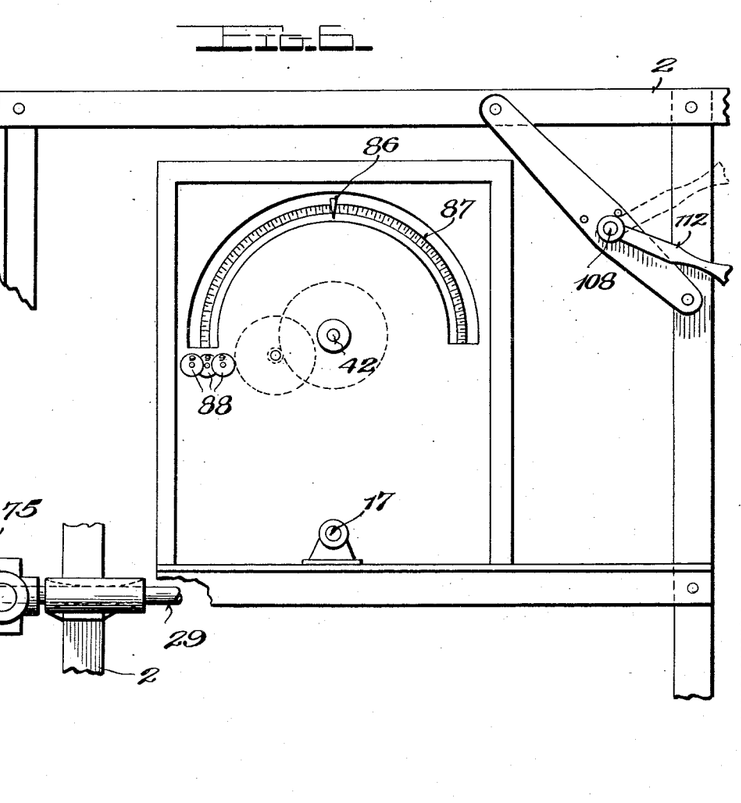
Fig. 5 is a detail view of the driving mechanism and means for regulating the same.
Figure 6:
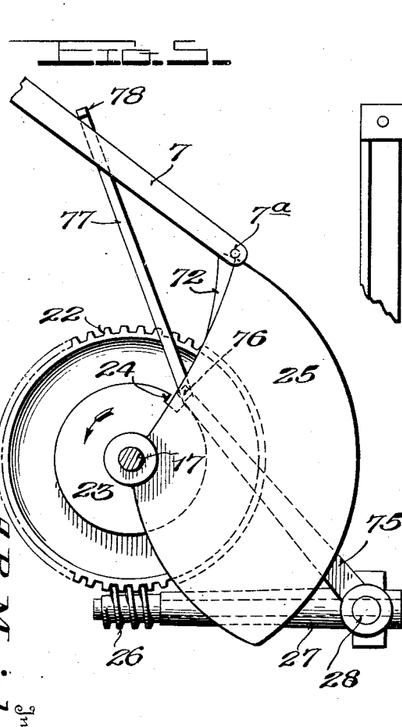
Fig. 6 is an outline diagrammatic view of the registering and recording mechanism.

Attached to swing freely from the upper end of arm 75 is an arm 77 which at its free end carries a suitable pin or projection 78 which extends over and engages the inner end portion of arm 7.

On the hollow stud 43, previously referred to is a cam pawl lever 80, spaced by the collar 47 from the ratchet wheel 46, (on shaft 42). A pin 81, on the sector 56, engages the cam portion of the pawl lever 80. At its upper outer end the lever carries a pawl 82, having the usual spring 83, and said pawl normally rides on the periphery of the enlarged portion 52 of the wheel 51, but is of sufficient width to engage the ratchet wheel 46 when it clears the said enlarged portion of the wheel 51. A suitable stop 84 is positioned so that it will be engaged by a rearward extension of the pawl 82.

To prevent retrograde movement of the ratchet wheel I also provide a detent 85. An angled indicator hand 86 is carried by the wheel or disk 51 and is adapted to coöperate with a suitable graduated scale or dial 87.

In order to prevent additional movement of these parts by momentum the following described brake mechanism is employed.

On the shaft 17 I place two adjacent collars 89 and 90, oppositely cut away as at 91. Bars 92 are pivoted to the machine frame, said bars being on opposite sides of the collars and have at their upper ends brakes 93 and at their lower ends adjustable screws 94, the screw carried by one bar coöperating with one collar and that of the other bar with the opposite collar. The brakes 93 coöperate with the brake wheel 53. The two bars are connected by a suitable spring 95.

Extending halfway around the brake wheel 53 and attached thereto is a second thin metal tape 96 extending upward and connected to a spring 97 suitably located in the upper part of the frame, causing wheel 53 to rotate as beam or arm 8 rises, this rotation being in exact proportion to weight of seed in box or hopper 5.

The flattened or cut away portions of the collars 89, 90 and the screws 94 are so adjusted that the screws engage the flattened portions 91 during recording period, or during travel of the pawl arm or lever 80. During this period of time the spring 95 draws the lower ends of the bar together, spreading the upper ends and throwing the brake portions 93 into engagement with the brake wheel 53. This prevents friction of pawl traveling on the wheel or disk 51 altering position of said wheel and thereby producing inaccurate record of weights being made.

The stop 84 also serves the same purpose, lifting the pawl 82 slightly out of engagement with the wheel 51, viz. its enlarged portion 52, while the pawl is stationary, so that the wheel rotates without friction from contact with the pawl.

The object of the lower hopper 5 is to weigh exactly the amount of material delivered from the chute. The object of the upper hopper 3 is to approximate this weight and deliver to the hopper 5 substantially proper amount of material each time. This is accomplished in the following manner:

The chute 1 is attached to the main body of the machine or frame by standards 98. Journaled in the upper ends of the standards is a shaft 99, passing beneath the chute, and having at its outer end a crank arm 100, and a weighted lever 101. Pivoted to the crank 100 is a rod 102 extending downward through a guide 103 attached to one of the standards 98. The lower portion of this rod carries adjustable pins 104, 105. These pins straddle the arm 70 and are so adjusted that the arm will strike pin 105 when it has completed approximately two thirds of its normal upward movement thereby raising crank 100 and depressing a gate 106 which is attached to shaft 99.

Weighted lever 101 with weight 101$^a$ swings forward past the center of shaft 99 and finishes the closing of the gate 106. After the hopper 4 has dumped its contents into hopper 5 and has moved back two thirds toward its normal position, arm 70 descending in unison therewith, strikes pin 104, and forces the lever 101 back to its original position with gate 106 open. This cuts off supply of material to the hopper 4 during the time it is dumping. It serves to make approximation of weight more correct and is not absolutely essential to the successful operation of the machine.

For weighing remnants of seed, especially desirable in connection with seed cotton, where each customer gets back his own seed, I provide means for weighing by manual operation small fractional parts, as follows:

A shaft 108 is arranged beneath the arm 7 and has attached to it a lever 109. Said lever has a sleeve at its free end in which is mounted a slidable beveled spring pressed bolt 110, similar to the common door lock bolt. Attached to a side of the arm 7 is a flanged plate 111, the inclination between the arm 7 and the lever being such that when lever 109 reaches its highest position the bolt 110 will have passed from beneath the flange of the plate, leaving the arm 7 free. If lever 109 is depressed the bolt will again return to position beneath the flange.

Outside the body of the machine or the casing inclosing it a hand lever 112 is secured to shaft 108. Secured to the shaft within the casing is a short arm 113, provided with a curved link 114 connected in turn with a spring 115. This serves to hold the shaft 108 in either position, due to raising or lowering the lever 112.

Briefly the operation of the parts above described is as follows:—

It will be assumed that seed is being delivered from an elevator to chute 1 and that gate 106 is in open position, and that weight on arm 70 has been set for seventy-five pounds. The seed flows from chute into hopper 3 until approximately seventy five pounds of seed has entered the hopper, when the hopper descends and gate 106 is closed, and worm 26 is lifted into mesh with worm wheel 22. It will be noted that latch 72 has passed under pin 7$^a$ on beam 7 and that the lug 76 is out of the notch 24 in disk 23 thus making it impossible for the worm to disengage from the worm gear until one complete rotation of shaft 17 has taken place. The first result of rotation of said shaft is to bring cam 20 into contact with arm 32 thereby dumping the contents of hopper 3 into hopper 5.

Further rotation of shaft 17 closes hopper 3, and the action of cam 25 allows it to rise gently to its former position, opening the seed gate 106 and permitting the flow of seed to the hopper 3 to be again resumed.

The open part of cam 18 has now commenced to pass over roller 65, and due to weight of contents of hopper 5, arm 8 is rising steadily upward, disk 51 rotating with it until a point is reached where resistance of spring 62, or weight if one is employed, balances weight of material in the hopper 5. If the approximation has been accurate the disk 51 should come to dead rest at the point where indicator hand 86 indicates seventy five pounds on dial 87. Brakes 93 are now applied and sector 56 comes into engagement with pinion 44 and causes pawl arm 80 to begin its half revolution contraclockwise. Pawl 82 falls downward on to rim portion 52 of the disk 51 sliding thereon until the end of this rim portion is reached when it falls into engagement with a tooth on ratchet wheel 46 and carries the ratchet wheel with it for the remainder of its travel. Rotation of the ratchet wheel is communicated through shaft 42 and through suitable gearing to a recording device, which may be of any desired type, and which does not form a part of this invention, and which is indicated in outline as having counting wheels 88, and these will add and indicate the weight, seventy-five pounds.

The opposite edge of cam 18 now comes into contact with roller 65 and arm 8 is steadily depressed, hopper 5 being lifted thereby by the outer end of the arm, and pawl lever 80 begins its reverse movement to zero position.

Cam 21 now comes into contact with roller 41 on arm 32 and box 5 is opened and closed. Notch 24 then passes under the lug 76 which drops into it thus allowing the worm 26 to fall out of mesh with the worm wheel 22, and the rotation of the shaft 17 stops, with all parts back in their original position.

This cycle of operation is repeated until all of the material has been weighed. It is of course understood that the counting wheels show the addition of each hopper full weighed, showing at the close the total amount of material passing through the hoppers, while the indicator shows on dial 87 the weight discharged each time from hopper 5.

At the end there may remain in hopper 3 an amount too small to actuate it. This is discharged by operating the hand lever, and is weighed and recorded by hopper 5 and the weighing mechanism the same as previous lots, its correct weight being added to that before recorded, however small it may be.

It will be especially noted that the lowering of box or hopper 5 and the elevating of arm 8 causes tape wheel 54 to rotate in exact proportion to the weight of seed in hopper 5, this through the medium of their common shaft causes rotation of disk 51 to the same extent, thereby guiding the pawl 82 into engagement with the tooth of the ratchet wheel which will rotate that wheel the proper distance to record the correct amount. The guiding of this pawl by the rim portion 52 to the proper tooth of the ratchet is one of the vital points of the present invention.

I have shown the hoppers as having different shaped bottoms. Preferably the same form would be used on both, and either shape of bottom can be used.

To clearly understand the invention designed to be protected by this application it should be carried in mind that disk 51 and ratchet wheel 46 are independent of each other. That during the partial rotation of disk 51 the pawl is out of contact with it, being lifted by contact with stop 84. When the disk has traveled a sufficient distance to cause the indicator to register the amount of material in hopper 5 it comes to a dead rest and is locked in that position by the brakes 92. That sector 56 then engages the pinion 44, and the pawl lever is connected thereto, or might be integral with it, and the pawl is then swung, disk 51 remaining stationary. The disk has stopped at such point in its rotation that the end of the stepped portion of the rim, or the enlarged portion 52, registers with the proper tooth on the ratchet wheel. When the pawl drops from this portion it engages that tooth and for the remainder of its travel it turns the ratchet wheel. Sector 58 and weight 59 return the pawl arm to normal position, the detent 85 prevents reverse rotation of the ratchet wheel, and the pin 81 engaging the cam portion of the pawl lever provides for smooth steady return of the pawl arm to normal position.

What I claim is:—

1. A device of the kind described comprising a vertically movable hopper, a ratchet operated adding device, a pawl adapted to rotate said ratchet, a disk having a stepped rim portion adapted to receive and guide the pawl to a tooth of said ratchet, and means connecting said hopper with said disk, rotation of said disk and movement of the pawl being regulated by weight of material in said hopper.

2. A weighing device having normally locked mechanism including a ratchet wheel, a totalizing device actuated thereby, a disk having an enlarged stepped rim portion, a dial, an index hand carried by the disk and working over the dial, a pawl lever, a pawl carried thereby and adapted to be guided along said rim to said ratchet, vertically movable, alining hoppers, the upper one discharging into the lower one, and means whereby downward movement of one of said hoppers unlocks said weighing mechanism.

3. In a weighing device, upper and lower hoppers the upper hopper discharging into the lower one, movable arms supporting said hoppers, a main shaft, means for stopping the rotation of said shaft at predetermined times, said means being controlled by movement of the supporting arm of the upper hopper, a registering mechanism operatively connected to the lower arm and actuated by rotation of said main shaft, said mechanism comprising a ratchet wheel, a disk having a stepped rim, a pawl lever having a cam portion, and a pawl, the stepped rim of the disk guiding the pawl to the proper tooth of the ratchet as determined by the weight of material in the lower hopper and means controlled by the hopper for imparting partial rotation to said disk.

4. In a weighing device, registering mechanism controlled by a ratchet wheel, a pawl for actuating said ratchet wheel, a hopper for receiving material to be weighed, means for moving said pawl through a predetermined distance, a disk having a stepped rim portion adapted to hold said pawl out of engagement with the ratchet wheel, and means for rotating said disk to an extent proportionate to the amount of material in the hopper, the pawl actuating the ratchet wheel through the remainder of the pawl movement in one direction after clearing the stepped rim portion of the disk.

5. A device of the kind described comprising a weighing hopper, a main shaft, a toothed sector carried thereby, a pawl arm actuated in one direction by movement of said sector, means for returning the pawl arm to normal position, a ratchet wheel operatively connected to a totalizing device of any type, and movable only by said pawl, and a disk having an enlarged rim portion holding said pawl away from said ratchet-wheel, said disk being controlled by said hopper and rotating in unison with vertical movement of the hopper and in proportionate extent, the pawl dropping from the rim portion during such rotation and engaging the ratchet wheel throughout remainder of the pawl travel in the direction imparted by said sector.

6. In a device of the kind described, vertically movable alining hoppers, a registering ratchet wheel, an independently rotatable registering disk, having a portion of its rim enlarged, means for rotating said disk in proportion to the actual weight of material in the lower hopper, a pawl lever having a predetermined fixed amount of travel, a pawl thereon traveling on the enlarged rim portion of the disk through a part of its travel and engaging the ratchet wheel during the remainder of the travel of the pawl, such engagement being regulated by extent of rotation of the disk, and brake mechanism for locking said disk in fixed position during travel of the pawl thereon.

7. In a device of the kind described having registering and adding mechanism, a ratchet wheel adapted to actuate the adding device, a disk, a registering index carried thereby, said disk having an enlarged rim portion, a pawl arm, said arm having a definite amount of travel, a pawl carried thereby and adapted to engage the disk rim and the ratchet wheel successively, a vertically movable hopper, means connecting said disk to the hopper for giving a partial rotation of the disk to an extent proportionate to the weight of the hopper, shifting the enlarged rim portion with respect to the pawl, means for then causing said pawl to travel along the rim portion and to fall therefrom to the ratchet wheel, said ratchet wheel moving with the pawl through the remainder of the pawl travel in the same direction, means for locking the disk during pawl travel, and means for locking the ratchet wheel against reverse rotation.

In testimony whereof I affix my signature.

ALFRED ROBERT MUIRHEAD.